US010837699B2

(12) United States Patent
Ryu et al.

(10) Patent No.: US 10,837,699 B2
(45) Date of Patent: Nov. 17, 2020

(54) REFRIGERATOR

(71) Applicant: LG ELECTRONICS INC., Seoul (KR)

(72) Inventors: Heekwon Ryu, Seoul (KR); Sunam Chae, Seoul (KR)

(73) Assignee: LG Electronics Inc., Seoul (KR)

(*) Notice: Subject to any disclaimer, the term of this patent is extended or adjusted under 35 U.S.C. 154(b) by 48 days.

(21) Appl. No.: 16/046,594

(22) Filed: Jul. 26, 2018

(65) Prior Publication Data

US 2019/0063822 A1 Feb. 28, 2019

(30) Foreign Application Priority Data

Aug. 25, 2017 (KR) .................. 10-2017-0107949

(51) Int. Cl.
*F25D 29/00* (2006.01)
*F25D 11/02* (2006.01)
*F25D 23/00* (2006.01)

(52) U.S. Cl.
CPC ............ *F25D 29/00* (2013.01); *F25D 11/022* (2013.01); *F25D 23/003* (2013.01);
(Continued)

(58) Field of Classification Search
CPC ...... F25D 11/02; F25D 11/022; F25D 11/025; F25D 29/00; F25D 23/003; F25B 2700/2106; F25B 49/02
See application file for complete search history.

(56) References Cited

U.S. PATENT DOCUMENTS

2007/0144188 A1* 6/2007 Kaga ..................... F25D 19/02
62/157
2013/0047659 A1* 2/2013 Kim ...................... F25D 11/022
62/441
(Continued)

FOREIGN PATENT DOCUMENTS

CN 102967104 A 3/2013
CN 105627496 A * 6/2016
(Continued)

OTHER PUBLICATIONS

CN-105627496-A English Translation (Year: 2016).*

*Primary Examiner* — Marc E Norman
*Assistant Examiner* — Schyler S Sanks
(74) *Attorney, Agent, or Firm* — Dentons US LLP

(57) ABSTRACT

A refrigerator includes a control module which controls a first compressor, a second compressor, a first fan, a second fan, and a third fan, in which the control module performs a high-temperature initial simultaneous operation when the outside air temperature is at the outside air set temperature or more, performs a high-temperature initial alternation operation when the freezing compartment temperature is at the freezing compartment set temperature or less and the refrigerating compartment temperature is at the refrigerating compartment set temperature or less during the high-temperature initial simultaneous operation. The control module drives the first compressor and the second compressor together during the high-temperature initial simultaneous operation, and alternately drives the first compressor and the second compressor during the high-temperature initial alternation operation.

19 Claims, 6 Drawing Sheets

(52) U.S. Cl.
CPC ..... *F25B 2400/061* (2013.01); *F25B 2600/02* (2013.01); *F25B 2600/111* (2013.01); *F25B 2600/112* (2013.01); *F25B 2700/2106* (2013.01); *F25D 2700/121* (2013.01); *F25D 2700/122* (2013.01); *F25D 2700/14* (2013.01)

(56) References Cited

U.S. PATENT DOCUMENTS

2013/0061620 A1\* 3/2013 Li .............................. F25B 5/02
62/126
2014/0013779 A1\* 1/2014 Cho ...................... F25D 11/022
62/56

FOREIGN PATENT DOCUMENTS

| EP | 2479519 A2 | 7/2012 |
|---|---|---|
| WO | 2008082084 A1 | 7/2008 |
| WO | 2015160162 A1 | 10/2015 |
| WO | WO-2015160162 A1 * | 10/2015 |

\* cited by examiner

REFRIGERATOR

CROSS-REFERENCE TO RELATED APPLICATIONS

The present application claims priority under 35 U.S.C. § 119 and 35 U.S.C. § 365 to Korean Patent Application No. 10-2017-0107949, filed on Aug. 25, 2017, all of which are hereby incorporated by reference in their entirety.

BACKGROUND

A refrigerator is an apparatus for preventing products such as foods from being spoiled, medicines and cosmetics from being corrupted or deteriorated, and etc., by cooling or storing the products at a low-temperature.

The refrigerator may include one or more compartments in which products are stored and a freezing cycle device for cooling the one or more compartments.

The freezing cycle device may include a compressor, a condenser, an expansion mechanism, and an evaporator, through which refrigerant circulates.

The one or more compartments may include a freezing compartment which is maintained at a subzero temperature range and a refrigerating compartment which is maintained at an above zero temperature range, and the freezing compartment and the refrigerating compartment may be cooled by at least one evaporator.

The refrigerator may independently cool the freezing compartment and the refrigerating compartment, and in this case, the freezing compartment temperature and the refrigerating compartment temperature can be adjusted more quickly.

One example of a refrigerator that independently cools the freezing compartment and the refrigerating compartment may include one freezing cycle device in which a freezing compartment evaporator and a refrigerating compartment evaporator are connected in parallel to each other or in series with each other.

Another example of a refrigerator that independently cools the freezing compartment and the refrigerating compartment is a refrigerator in which the freezing compartment and the refrigerating compartment are cooled by independent freezing cycle devices which are independent to each other, such as a refrigerator that includes a first freezing cycle device for cooling the freezing compartment, a second freezing cycle device cooling the refrigerating compartment. The first freezing cycle device and the second freezing cycle device may be controlled by one control module.

The refrigerator having the two independent freezing cycle devices may increase the current and power of the compressor to quickly reach the target temperature in a case where the outside air temperature is high. In this case, the control module for controlling the two freezing cycle devices may be overheated if the time when the two freezing cycle devices are operated together continues for a long time and the control module may be damaged or operate abnormally when the control module is overheated.

SUMMARY

One objective is to provide a refrigerator which can quickly cool a freezing compartment and a refrigerating compartment and minimizes overheating of a control module when the outside air temperature is high.

According to an embodiment of the present invention, there is provided a refrigerator including: a first freezing cycle device which includes a first compressor, a first condenser, a first expansion mechanism, and a first evaporator, through which refrigerant circulates; a first fan which circulates the cool air in a freezing compartment to the first evaporator and the freezing compartment; a second freezing cycle device which includes a second compressor, a second condenser, a second expansion mechanism, and a second evaporator, through which the refrigerant circulates; a second fan which circulates the cold air in a refrigerating compartment to the second evaporator and the refrigerating compartment; a third fan which blows the outside air to the first condenser and the second condenser; and a control module which controls the first compressor, the second compressor, the first fan, the second fan, and the third fan, in which the control module performs a high-temperature initial simultaneous operation when the outside air temperature is at the outside air set temperature or more, performs a high-temperature initial alternation operation when the freezing compartment temperature exceeds the freezing compartment set temperature and the refrigerating compartment temperature is at the refrigerating compartment set temperature or less during the high-temperature initial simultaneous operation, and the control module drives the first compressor and the second compressor together during the high-temperature initial simultaneous operation, and drives each of the first fan, the second fan, and the third fan, and alternately drives the first compressor and the second compressor during the high-temperature initial alternation operation.

The control module may alternately perform the freezing compartment single operation in which the first compressor is driven for a first set time and a refrigerating compartment single operation in which the second compressor is driven for a second set time during the high-temperature initial alternation operation, and the first set time may be longer than the second set time.

The control module may control the first compressor to the maximum freezing capacity and may control the second compressor to a set freezing capacity which is lower than the maximum freezing capacity during the high-temperature initial simultaneous operation.

The control module may drive each of the first fan, the second fan, and the third fan with a first set operation rate which is lower than the highest operation rate during the high-temperature initial simultaneous operation.

The control module may control the first compressor to the maximum freezing capacity and the second compressor to the maximum freezing capacity during the high-temperature initial alternation operation.

The control module may drive the first fan with the first set operation rate when the first compressor is driven, drive the second fan with the first set operation rate when the second compressor is driven, and drive the third fan at the first set operating rate, during the high-temperature initial alternation operation.

The control module may perform the high-temperature general simultaneous operation when the freezing compartment temperature is at the freezing compartment set temperature or less and the freezing compartment temperature is at a freezing compartment upper limit temperature or the refrigerating compartment temperature is at a refrigerating compartment upper limit temperature during the high-temperature initial simultaneous operation or during the high-temperature initial alternation operation.

The control module may alternately drive the first compressor and the second compressor, drive the first fan when the first compressor is driven, and drive the second fan and drive the third fan when the second compressor is driven, during a high-temperature general alternation operation.

The control module may control the first compressor to the maximum freezing capacity and control the second compressor to the maximum freezing capacity during high-temperature general alternation operation.

The control module may drive each of the first fan, the second fan, and the third fan at a second set operation rate lower than the first set operation rate during the high-temperature general alternation operation.

The high-temperature general alternation operation may continue until the freezing compartment temperature falls into a freezing compartment satisfaction range and the refrigerating compartment temperature falls into a refrigerating compartment satisfaction range.

If the outside air temperature is at the set temperature or less, the control module can perform the low-temperature initial simultaneous operation. The control module may drive the first compressor and the second compressor and drive the first fan, the second fan, and the third fan, respectively, during low-temperature initial simultaneous operation.

The control module may control the first compressor to the maximum freezing capacity, and control each of the second compressor to the maximum freezing capacity, and can drive the first fan, the second fan, and the third fan at a second set operating rate which is lower than the highest operating rate during low-temperature initial simultaneous operation.

If the freezing compartment temperature is at a freezing compartment upper limit temperature or the refrigerating compartment temperature is at a refrigerating compartment upper limit temperature during low-temperature initial simultaneous operation, the control module may perform the low-temperature general simultaneous operation.

The control module may drive the first compressor and the second compressor together during the low-temperature general simultaneous operation, drive each of the first fan, the second fan, and the third fan, and can variably control the freezing capability of each of the first compressor and the second compressor.

The control module may perform the low-temperature general alternation operation when the freezing compartment temperature is lower than the freezing compartment upper limit temperature and the refrigerating compartment temperature is lower than the refrigerating compartment upper limit temperature during the low-temperature initial simultaneous operation.

The control module may alternately drive the first compressor and the second compressor, drive the first fan when the first compressor is driven, can drive the second fan when the second compressor is driven, can drive the third fan, and can variably control cooling capacity of each of the first compressor and the second compressor, during a low-temperature general alternation operation.

According to the embodiment of the present invention, when the outside air temperature is higher than the outside air set temperature, the freezing compartment and the refrigerating compartment can be quickly cooled together and when the refrigerating compartment temperature falls into the refrigerating compartment set temperature or less, it is possible to minimize overheating and damage of the control module by driving alternately the first compressor and the second compressor.

In addition, during the high-temperature initial alternation operation, since the freezing compartment cooling time is longer than the refrigerating compartment cooling time, the entire time in which both the freezing compartment and the refrigerating compartment reach the target temperature can be minimized.

In addition, during the high-temperature initial simultaneous operation, the second compressor is controlled to have a lower set freezing capacity than the maximum freezing capacity, so that excessive increase in the temperature of the control module during high-temperature initial simultaneous operation can be restricted.

In addition, the temperature of each of the freezing compartment and the refrigerating compartment can be quickly lowered by driving the first fan, the second fan, and the third fan at the first set operation rate, respectively, during the high-temperature initial simultaneous operation and the high-temperature initial alternation operation and each of the first fan, the second fan, and the third fan are driven at a second set operation rate which is lower than the first set operation rate during the high-temperature general simultaneous operation or the high-temperature general alternation operation, so that power consumption can be minimized.

In addition, there is an advantage that the load having a condition that the outside air temperature is the outside air set temperature or more can quickly correspond and the total time which is taken from a start-up time point of the first compressor and the second compressor to an off time point when both first and second compressors are turned off can be shortened, by controlling each of the first compressor and the second compressor to the maximum freezing capacity during the high-temperature general simultaneous operation or the high-temperature general alternation operation.

In addition, there is an advantage that, during the low-temperature initial simultaneous operation, each of the first compressor and the second compressor is controlled to the maximum freezing capacity, and the refrigerant can quickly correspond to the initial load after the power is input to the refrigerator.

In addition, during the low-temperature initial simultaneous operation, the low-temperature general simultaneous operation, or the low-temperature general alternation operation, each of the first fan, the second fan, and the third fan are driven at a second set operation rate which is lower than the first set operation rate and can minimize the power consumption.

DETAILED DESCRIPTION OF THE EMBODIMENTS

Hereinafter, specific embodiments of the present invention will be described in detail with reference to the drawings.

Figure 1:
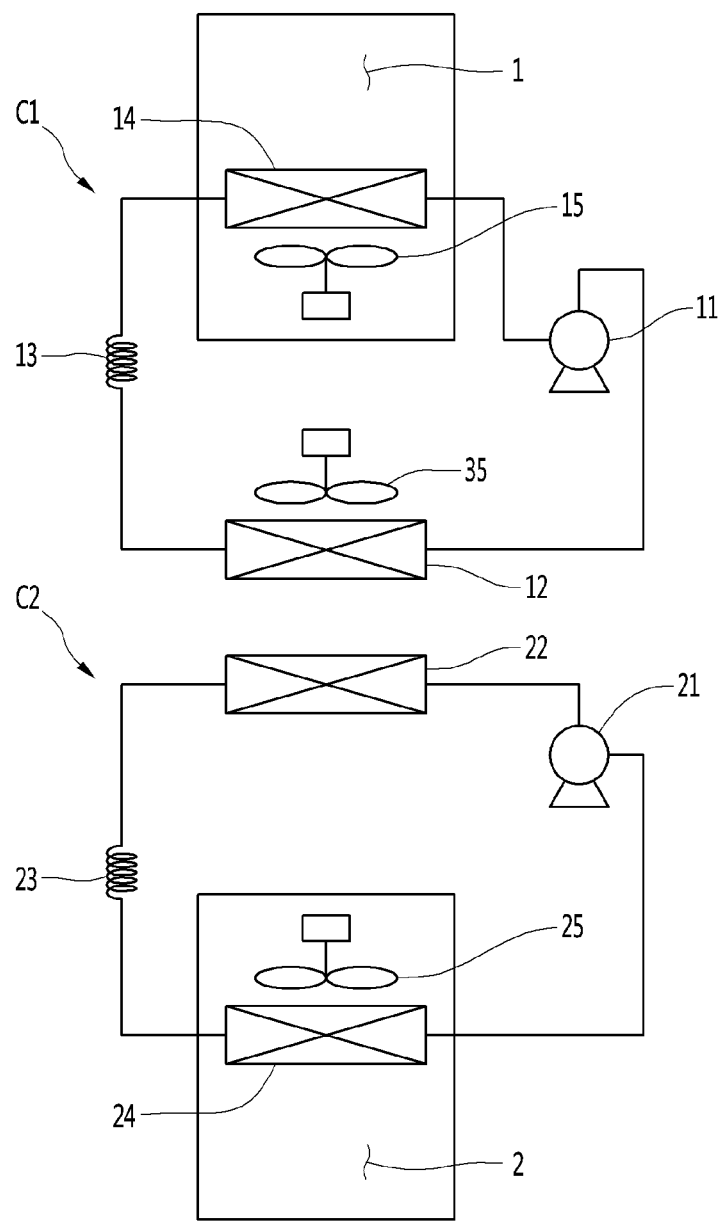
FIG. 1 is a view illustrating a configuration of a refrigerator according to an embodiment of the present invention.
Figure 2:
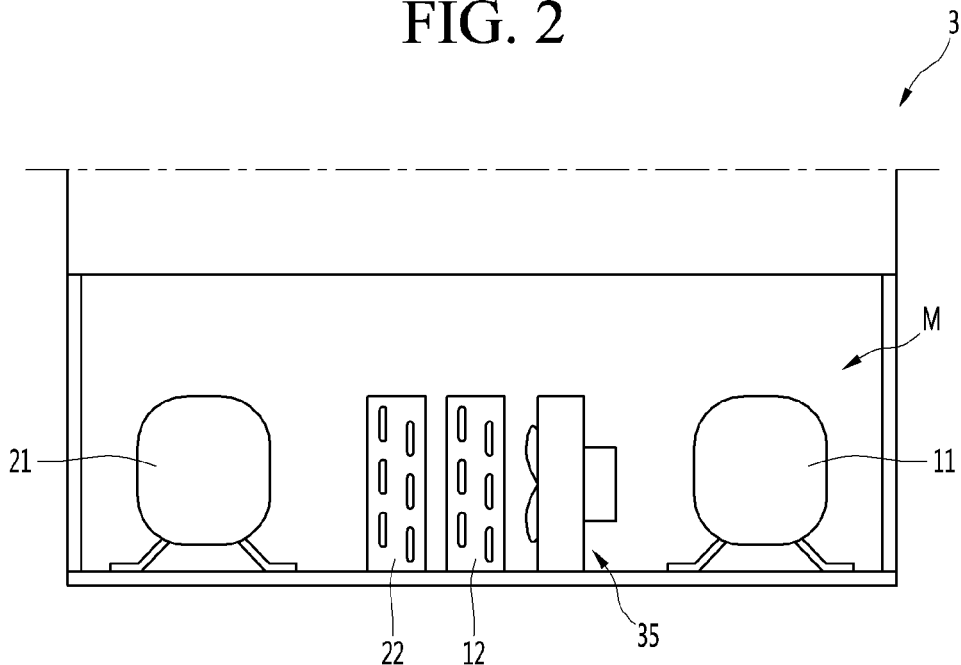
FIG. 2 is a rear view illustrating an inside of a machine compartment of a refrigerator according to an embodiment of the present invention.
Figure 3:
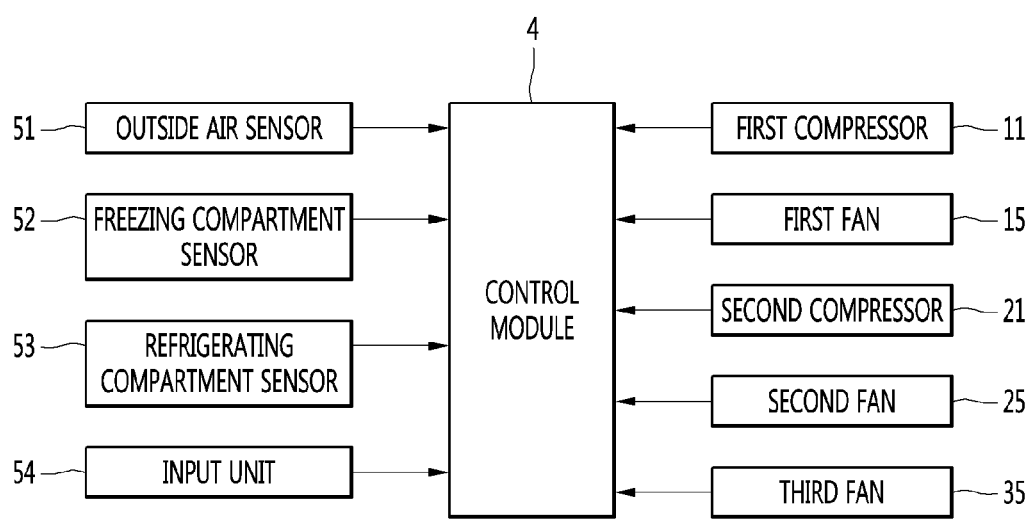
FIG. 3 a control block diagram illustrating a refrigerator according to an embodiment of the present invention.
Figure 4:
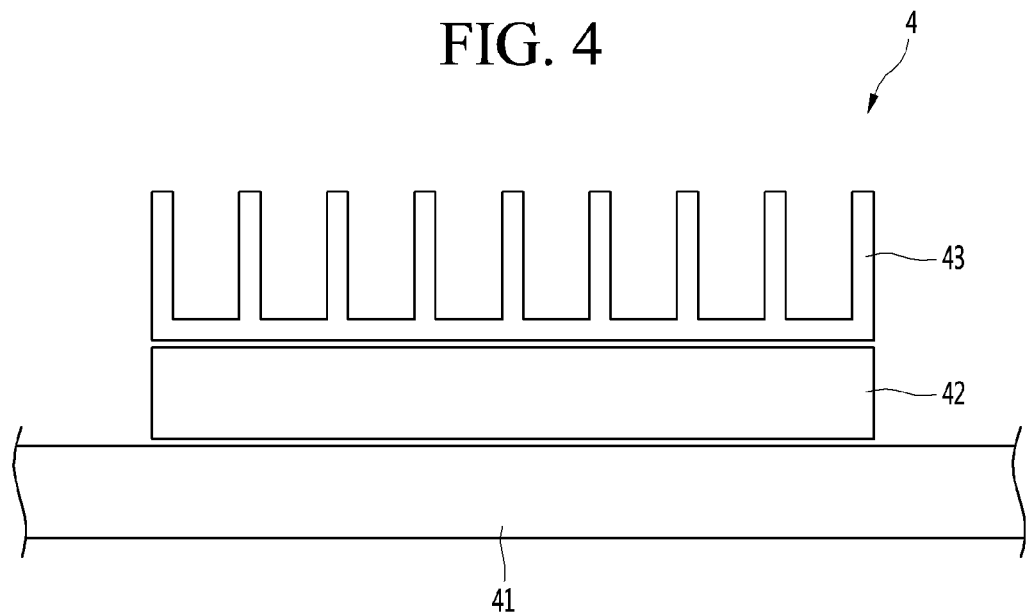
FIG. 4 is a side view illustrating a control module of a refrigerator according to an embodiment of the present invention.

FIG. 1 is a view illustrating a configuration of a refrigerator according to an embodiment of the present invention, FIG. 2 is a rear view illustrating an inside of a machine compartment of a refrigerator according to an embodiment of the present invention, FIG. 3 is a control block diagram illustrating a refrigerator according to an embodiment of the present invention, and FIG. 4 is a side view illustrating a control module of a refrigerator according to an embodiment of the present invention.

The refrigerator of the present embodiment may include a first freezing cycle device C1 which cools freezing compartment 1, a second freezing cycle device C2 which cools the refrigerating compartment 2, and a control module 4 which controls the first freezing cycle device C1 and the second freezing cycle device C2.

The first freezing cycle device C1 may include a first compressor 11, a first condenser 12, a first expansion mechanism 13, and a first evaporator 14, through which refrigerant circulates.

The refrigerator may further include a first fan 15 which circulates cool air in the freezing compartment 1 to the first evaporator 14 and the freezing compartment 1. The first fan 15 may be a freezing compartment fan which blows cool air to the freezing compartment 1.

The second freezing cycle device C2 may include a second compressor 21, a second condenser 22, a second expansion mechanism 23, and a second evaporator 24, through which the refrigerant circulates.

The refrigerator may further include a second fan 25 which circulates cold air in the refrigerating compartment 2 to the second evaporator 24 and the refrigerating compartment 2. The second fan 25 may be a refrigerating compartment fan which blows cool air to the refrigerating compartment 2.

The refrigerator may further include a third fan 35 which blows the outside air to the first condenser 12 and the second condenser 22. The third fan 35 may be a condensing fan which condenses the refrigerant passing through the first condenser 12 and the refrigerant passing through the second condenser 22.

The refrigerator may include the third fan 35 configured with one condensing fan which blows the outside air to the first condenser 12 or configured as a first condensing fan for blowing the outside air to the first condenser 12 and a second condensing fan which blows the outside air to the second condenser 22.

The refrigerator may include a main body 3, where the freezing compartment 1 and the refrigerating compartment 2 are defined and formed in the main body 3, and a machine compartment M formed separately from the freezing compartment 1 and the refrigerating compartment 2.

The first compressor 11, the second compressor 21, the first condenser 12, the second condenser 22, and the third fan 35 are disposed in the machine compartment M, as illustrated in FIG. 2.

The first compressor 11 and the second compressor 21 may be disposed apart from each other in the machine compartment M.

The first condenser 12 and the second condenser 22 may be disposed between the first compressor and the second compressor 21.

The third fan 35 sucks the outside air, that is, air outside of the machine compartment M and blows the outside air to the first condenser 12 and the second condenser 22. The third fan 35 may be disposed between the first condenser 12 and the first compressor 11 or may be disposed between the second condenser 22 and the second compressor 12.

The control module 4 controls the first compressor 11, the second compressor 21, the first fan 15, the second fan 25, and the third fan 35, as illustrated in FIG. 3.

The control module 4 may be connected to each of the first compressor 11, the second compressor 21, the first fan 15, the second fan 25, and the third fan 35.

Each of the first compressor 11 and the second compressor 21 may be any one of a reciprocating compressor, a rotary compressor, and a scroll compressor or equivalent thereof.

In a case where the first compressor 11 and the second compressor 21 are reciprocating compressors, respectively, the reciprocating compressor may be a reciprocating type reciprocating compressor or a linear type linear compressor and the control module 4 can adjust strokes, by adjusting the current and power flowing to the first compressor 11 and the second compressor 21, and the freezing capacity (cooling power) may be adjusted accordingly.

Each of the first compressor 11 and the second compressor 21 may be controlled to a maximum freezing capacity TDC, may be controlled a set freezing capacity which is lower than the maximum freezing capacity TDC, and thus the freezing capacity may be variably controlled according to the outside air temperature or the load.

The set freezing capacity may be a freezing capacity that is set lower than the maximum freezing capacity TDC, as an example, a freezing capacity that is 80% of the maximum freezing capacity TDC.

The freezing capacities of the first compressor 11 and the second compressor 21 may be different from each other and, in this case, the maximum freezing capacity TDC of the first compressor 11 and the maximum capacity of the second compressor 21 may be different from each other, and the set freezing capacity of the first compressor 11 and the set capacity of the second compressor 21 may be different from each other.

Each of the first fan 15, the second fan 25, and the third fan 35 may be a variable speed fan whose speed is variable according to an applied voltage and may include a brushless DC (BLDC) motor and an impeller (or a propeller) connected to the BLDC motor, as an example.

The control module 4 outputs a control signal using a pulse width modulation (PWM) method, and controls the duty cycle of the output waveform to change the speed of each of the first fan 15 and the second fan 25, and the third fan 35.

The first fan 15, the second fan 25, and the third fan 35 may be driven at an operation rate selected by the control module 4 among a plurality of operation rates such as 100%, 95%, 90%, 85%, 80%, 75%, 70%, 65%, and 60% and the control module 4 may vary the operation rate of each of the first fan 15, the second fan 25, and the third fan 35 during the operation of the refrigerator.

Each of the first fan 15, the second fan 25, and the third fan 35 may have a high-speed mode, a medium speed mode, and a low-speed mode, the operation rate of the high-speed mode may be any one of 100%, 95%, 90%, the operation rate of the medium speed mode may be any one of 85%, 80%, and 75%, and the operation rate of the low-speed mode may be any one of 70%, 65%, and 60%.

The highest operating rate of each of the first fan 15, the second fan 25, and the third fan 35 may be 100%, and the first set operation rate of each of the first fan 15, the second fan 25, and the third fan 35 may be 90%, and the second set operation rate of each of the first fan 15, the second fan 25, and the third fan 35 may be 75%.

The refrigerator may include an outside air sensor 51 which detects a temperature of the outside air, a freezing compartment sensor 52 which detects a freezing compartment temperature, and a refrigerating compartment sensor 53 which detects a refrigerating compartment temperature.

The refrigerator may further include an input unit 54 which receives input of a freezing compartment desired temperature and a refrigerating compartment desired temperature.

The control module 4 is connected to the outside air sensor 51, the freezing compartment sensor 52, and the refrigerating compartment sensor 53.

The control module 4 is connected to the input unit 54. The user can input the freezing compartment desired temperature, the refrigerating compartment desired temperature or the like by inputting the input unit 54.

As illustrated in FIG. 4, the control module 4 may include a control board 41, a power device 42 which is installed on the control board 41, and a heat-radiation plate 43 which radiates the heat of the power device 42.

The control board 41 controls the first compressor 11, the second compressor 21, the first fan 15, the second fan 25, and the third fan 35 according to signals transmitted from the outside air sensor 51, the freezing compartment sensor 52, the refrigerating compartment sensor 53, and signals transmitted from the input unit 54, and, to this end, controls the power device 42.

The control board 41 may be provided with a coil, a diode, a capacitor, a microprocessor or an electronic control circuit, or the like.

The power device 42 may be configured with an insulated gate bipolar transistor (IGBT), which is a power switching device, or may be an Intelligent Power Module (IPM), in which the IGBT and a drive IC for driving the IGBT are integrated into a single package.

The first compressor 11, the second compressor 21, the first fan 15, the second fan 25, and the third fan 35 may be connected to the power device 42.

The control module 4 applies a voltage to each of the first compressor 11 and the second compressor 21 by using the power device 42.

Figure 5:
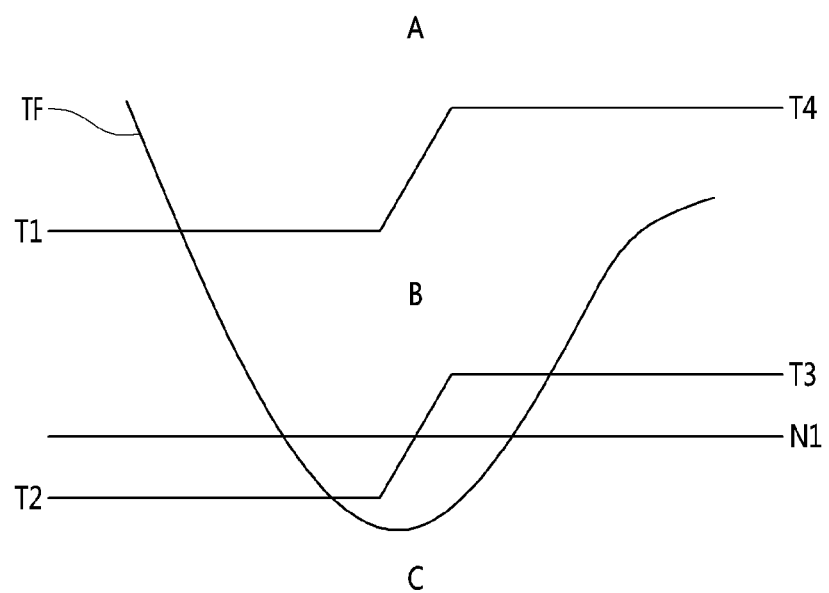
FIG. 5 is a diagram illustrating a freezing compartment temperature range of a refrigerator according to an embodiment of the present invention.

FIG. 5 is a diagram illustrating a freezing compartment temperature range of a refrigerator according to an embodiment of the present invention.

The control module 4 controls the first compressor 11 and the first fan 15 in accordance with the change in the freezing compartment temperature TF and controls on and off of the first compressor 11 and the first fan 15 in accordance with whether or not the freezing compartment temperature TF is in any temperature range of the plurality of freezing temperature ranges A, B, and C.

The plurality of freezing compartment temperature ranges A, B, and C may be divided into a freezing compartment upper limit range A, a freezing compartment dissatisfaction range B, and a freezing compartment satisfaction range C.

The plurality of freezing compartment temperature ranges A, B, and C may be set based on a freezing compartment target temperature N1, and the plurality of freezing compartment temperature ranges A, B, and C may have entry temperatures and release temperatures which are different from each other. Each of the freezing compartment temperature ranges A, B, and C have a temperature difference between entry temperature and release temperature.

Here, the freezing compartment target temperature N1 may be a freezing compartment desired temperature. The control module 4 determines the freezing compartment desired temperature input through the input unit 54 as the freezing compartment target temperature N1. The control module 4 determines whether or not the freezing compartment temperature is in any of the freezing compartment temperatures A, B, and C by patterns (rising or falling) of the freezing compartment temperature change and the freezing compartment temperature change.

The present embodiment may include a plurality of freezing compartment reference temperatures T1, T2, T3, and T4 for distinguishing these three freezing compartment temperature ranges A, B, and C.

The plurality of freezing compartment reference temperatures T1, T2, T3, and T4 includes a first freezing compartment reference temperature (T1: upper limit release/dissatisfaction entry temperature) in which the freezing compartment temperature TF, which gradually falls, enters the freezing compartment dissatisfaction range B while deviating from the freezing compartment upper limit range A; and a second freezing compartment reference temperature (T2: dissatisfaction release/satisfaction entry temperature) in which the freezing compartment temperature TF, which gradually falls, enters the freezing compartment satisfaction range C while deviating from the freezing compartment dissatisfaction range B.

The first freezing compartment reference temperature T1 may be set to be higher than the freezing compartment target temperature N1. The freezing compartment temperature TF may gradually fall when the first compressor 11 and the first fan 15 are driven, and thus the falling freezing compartment temperature IF reaches the first freezing compartment reference temperature T1 from a temperature which is higher than the first freezing compartment reference temperature T1.

In this case, the freezing compartment temperature TF may deviate from the freezing compartment upper limit range A and enter the freezing compartment dissatisfaction range B. The first freezing compartment reference temperature T1 may be a temperature that is set to be higher than the freezing compartment target temperature N1 by 2° C.

The second freezing compartment reference temperature T2 may be set to be lower than the freezing compartment target temperature N1. The freezing compartment temperature falls when the first compressor 11 and the first fan 15 are driven, and thus the falling freezing compartment temperature TF may be lower than the freezing compartment target temperature N1 and reaches the second freezing compartment reference temperature T2 which is lower than the freezing compartment target temperature N1. In this case, the freezing compartment temperature TF may deviate from the freezing compartment dissatisfaction range B and enter the freezing compartment satisfaction range C. The second freezing compartment reference temperature T2 may be a temperature that is set to be lower than the freezing compartment target temperature N1 by 0.5° C.

The freezing compartment temperature TF which is in the freezing compartment satisfaction range C may rise when the first compressor 11 and the first fan 15 are turned off and the plurality of freezing compartment reference temperatures T1, T2, T3, and T4 may further include the third freezing compartment reference temperature (T3; satisfaction release/dissatisfaction entry temperature) which deviates from the freezing compartment satisfaction range C and enters the freezing compartment dissatisfaction range B; and the fourth freezing compartment reference temperature (T4; dissatisfaction release/upper limit entry temperature) in which the gradually rising freezing compartment temperature TF deviates from the freezing compartment dissatisfaction range B and enters the freezing compartment upper limit range A.

The third freezing compartment reference temperature T3 may be set to be higher than the freezing compartment target temperature N1. The freezing compartment temperature may rise according to the load, and thus the rising freezing compartment temperature TF reaches the third freezing compartment reference temperature T3 from a temperature which is lower than the third freezing compartment reference temperature T3. In this case, the freezing compartment temperature TF may deviate from the freezing compartment satisfaction range C, and enter the freezing compartment dissatisfaction range B. The third freezing compartment reference temperature T3 may be a temperature which is higher than the freezing compartment target temperature N1 by 0.5° C.

The fourth freezing compartment reference temperature T4 may be set to be higher than the freezing compartment target temperature N1, the first freezing compartment reference temperature T1, and the third freezing compartment reference temperature T3. The freezing compartment temperature TF may rise according to the load, and thus the rising freezing compartment temperature TF reaches the fourth freezing compartment reference temperature T4 from a temperature which is lower than the fourth freezing compartment reference temperature T4. In this case, the freezing compartment temperature TF may deviate from the freezing compartment dissatisfaction range B and enter the freezing compartment upper limit range A. The fourth freezing compartment reference temperature T4 may be higher than the freezing compartment target temperature N1 by 2.5° C.

The first freezing compartment reference temperature T1 and the fourth freezing compartment reference temperature T4 may be the freezing compartment upper limit temperature for distinguishing the freezing compartment upper limit range A and the freezing compartment dissatisfaction range B. When the freezing compartment temperature TF reaches the freezing compartment upper limit temperature in the freezing compartment upper limit range during the high-temperature initial simultaneous operation or the high-temperature initial alternation operation, the control module 4 terminates the high-temperature initial simultaneous operation or the high-temperature initial alternation operation, which is being performed and performs the high-temperature general simultaneous operation or the high-temperature general alternation operation. High-temperature initial simultaneous operation, high-temperature initial alternation operation, high-temperature general simultaneous operation, and High-temperature general alternation operation will be described further below.

Figure 6:
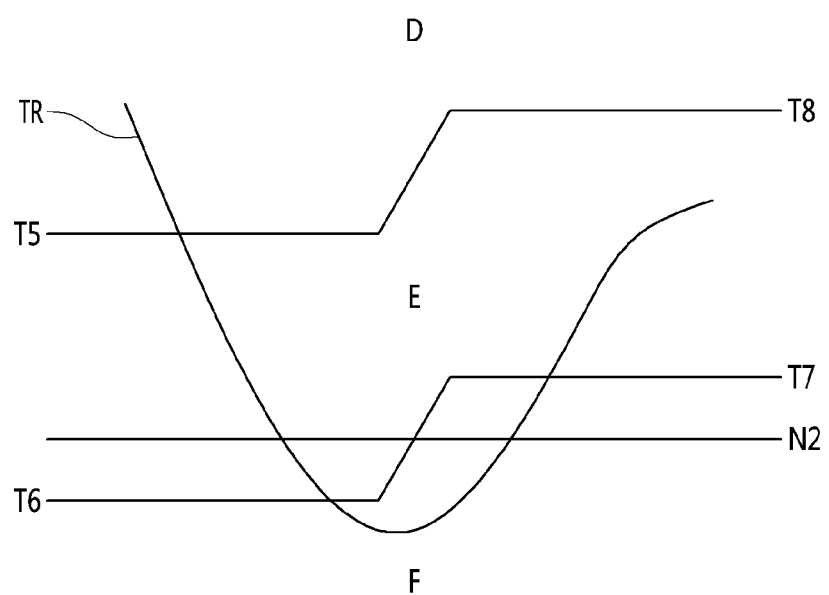
FIG. 6 is a diagram illustrating a temperature range of a refrigerating compartment of a refrigerator according to an embodiment of the present invention.

FIG. 6 is a diagram illustrating a temperature range of a refrigerating compartment of a refrigerator according to an embodiment of the present invention.

The control module 4 controls the second compressor 21 and the second fan 25 according to the change of the refrigerating compartment temperature TR and turns on and off the second compressor 21 and the second fan 25 according to whether or not the refrigerating compartment temperature TR is in any of a plurality of refrigerating compartment temperature ranges D, E, and F.

The plurality of refrigerating compartment temperature ranges D, E, and F may be divided into a refrigerating compartment upper limit range D, a refrigerating compartment dissatisfaction range E, and a refrigerating compartment satisfaction range F.

The plurality of refrigerating compartment temperature ranges D, E, and F may be set based on the refrigerating compartment target temperature N2 and the plurality of refrigerating compartment temperature ranges D, E, and F may have entry temperatures and releasing temperatures which are different from each other. The entry temperatures and the releasing temperatures of the refrigerating compartment temperature ranges D, E, and F may have a difference in temperature.

Here, the refrigerating compartment target temperature N2 may be the refrigerating compartment desired temperature. The control module 4 determines the refrigerating compartment desired temperature input through the input unit 54 as the refrigerating compartment target temperature N2. The control module 4 determines whether the current refrigerating compartment temperature is in any of the refrigerating temperature range D, E, and F by patterns (rising or falling) of the refrigerating compartment temperature and the refrigerating compartment temperature change.

The present embodiment may include a plurality of refrigerating compartment reference temperatures T5, T6, T7, and T8 for distinguishing these three refrigerating compartment temperature ranges D, E, and F.

The plurality of refrigerating compartment reference temperatures T5, T6, T7 and T8 may include a first refrigerating compartment reference temperature (T5: the upper limit release/dissatisfaction entry temperature) in which the refrigerating compartment temperature TR, which gradually falls, enters the refrigerating compartment dissatisfaction range E while deviating from the refrigerating compartment upper limit range D; and a second refrigerating compartment reference temperature (T6: dissatisfaction release/satisfaction entry temperature) in which the refrigerating compartment temperature TR, which gradually falls, enters the refrigerating compartment satisfaction range F while deviating from the refrigerating compartment dissatisfaction range E.

The first refrigerating compartment reference temperature T5 may be set to be higher than the refrigerating compartment target temperature N2. The refrigerating compartment temperature TR may gradually fall when the second compressor and the second fan 25 are driven, and thus the falling refrigerating compartment temperature TR reaches the first refrigerating compartment reference temperature T5 from a temperature which is higher than the first refrigerating compartment reference temperature T5. In this case, the refrigerating compartment temperature TR may deviate from the refrigerating compartment upper limit range D and enter the refrigerating compartment dissatisfaction range E. The first refrigerating compartment reference temperature T5 may be a temperature that is set to be higher than the refrigerating compartment target temperature N2 by 2.5° C.

The second refrigerating compartment reference temperature T6 may be set to be lower than the refrigerating compartment target temperature N2. The refrigerating compartment temperature TR may fall when the second compressor and the second fan 25 are driven, and thus the falling refrigerating compartment temperature TR may be lower than the refrigerating compartment target temperature N2, and it is possible to reach the second refrigerating compartment reference temperature T6, which is lower than the refrigerating compartment target temperature N2. In this case, the refrigerating compartment temperature TR may deviate from the refrigerating compartment dissatisfaction range E and enter the refrigerating compartment satisfaction range F. The second refrigerating compartment reference temperature T6 may be a temperature that is set to be lower than the refrigerating compartment target temperature N2 by 0.5° C.

The refrigerating compartment temperature TR which is in the refrigerating compartment satisfaction range F may rise when the second compressor 21 and the second fan 25 turn off. The plurality of refrigerating compartment reference temperatures T5, T6, T7, and T8 may further include a third refrigerating compartment reference temperature (T7; satisfaction release/dissatisfaction entry temperature) which deviates from the refrigerating compartment satisfaction range F and enters the refrigerating compartment dissatisfaction range E; and a fourth refrigerating compartment reference temperature (T8; dissatisfaction release/upper limit entry temperature) in which the gradually rising refrigerating compartment temperature TR deviates from the refrigerating compartment dissatisfaction range E and enters the refrigerating compartment upper limit range D.

The third refrigerating compartment reference temperature T8 may be set to be higher than the refrigerating compartment target temperature N2. The refrigerating compartment temperature TR may rise according to the load, and thus the rising refrigerating compartment temperature TR reaches the third refrigerating compartment reference temperature T7 at a temperature which is lower than the third refrigerating compartment reference temperature T7. In this case, the refrigerating compartment temperature TR may deviate from the refrigerating compartment satisfaction range F and enter the refrigerating compartment dissatisfaction range E. The first refrigerating compartment reference temperature T7 may be higher than the refrigerating compartment target temperature N2 by a temperature 0.5° C.

The fourth refrigerating compartment reference temperature T8 may be set to be higher than the refrigerating compartment target temperature N2, the first refrigerating compartment reference temperature T5, and the third refrigerating compartment reference temperature T7. The refrigerating compartment temperature TR may rise according to the load, and thus the rising refrigerating compartment temperature TR reaches the fourth refrigerating compartment reference temperature T8 from a temperature which is lower than the fourth refrigerating compartment reference temperature T8. In this case, the refrigerating compartment temperature may deviate from the refrigerating compartment dissatisfaction range E and enter the refrigerating compartment upper limit range D. The fourth refrigerating compartment reference temperature T8 may be higher than the refrigerating compartment target temperature N2 by 3° C.

The first refrigerating compartment reference temperature T5 and the fourth refrigerating compartment reference temperature T8 may be the refrigerating compartment upper limit temperature that distinguishes the refrigerating compartment upper limit range D from the refrigerating compartment dissatisfaction range E. When the refrigerating compartment temperature TR reaches the refrigerating compartment upper limit temperature at the refrigerating compartment upper limit range D during the high-temperature initial simultaneous operation and the high-temperature initial alternation operation, the control module 4 may terminate the high-temperature initial simultaneous operation or the high-temperature initial alternation operation and perform the high-temperature general simultaneous operation or the high-temperature general alternation operation.

Figure 7:
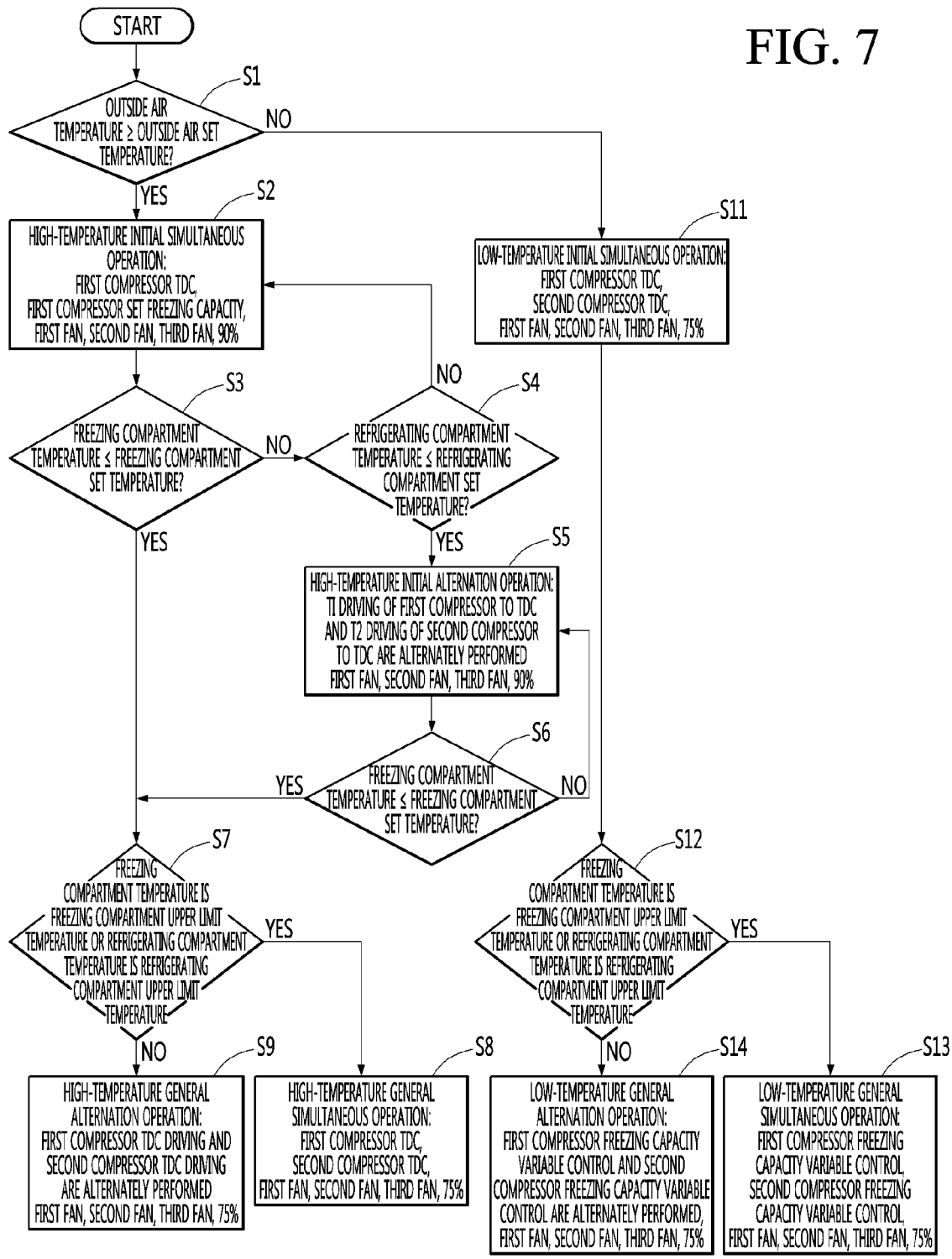
FIG. 7 is a flowchart illustrating a method for operating a refrigerator according to an embodiment of the present invention.
Figure 8:
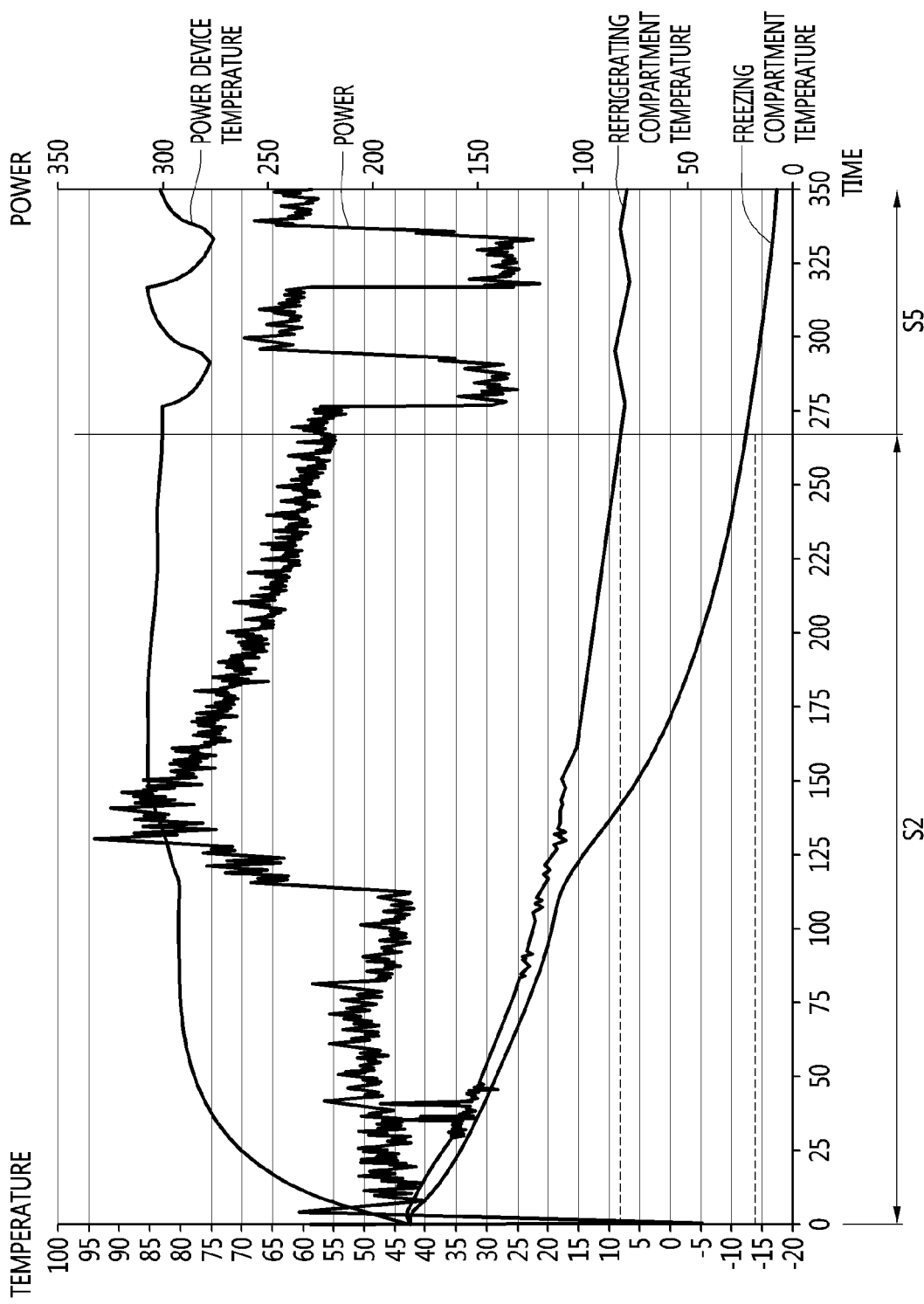
FIG. 8 is a graph illustrating changes in a freezing compartment temperature, a refrigerating compartment temperature, power, and a temperature of the control module during operation according to the operation method for the refrigerator according to the embodiment of the present invention.

FIG. 7 is a flowchart illustrating a method of operating a refrigerator according to an embodiment of the present invention, and FIG. 8 is a graph illustrating changes in a freezing compartment temperature, a refrigerating compartment temperature, power, and a temperature of the control module 4 during operation according to the operation method of the refrigerator according to the embodiment of the present invention. For example, the flowchart may be stored in a storage device, such as a semiconductor memory or hard drive, or the like, which when executed by the control module 4, causes the control module to perform the method of operating the refrigerator.

The control module 4 controls the refrigerator so that the temperature of the freezing compartment 1 may fall into the freezing compartment set temperature (for example, −13° C.) or less within a predetermined time (for example, 335 minutes) and the temperature of the refrigerating compartment 2 may fall into a refrigerating compartment set temperature (for example, 8° C.) or less when the power is applied and the refrigerator is operated in a state where the temperature of the outside air is high.

To this end, when the refrigerator is operated in a state where the temperature of the outside air is high, the control module 4 performs the high-temperature initial simultaneous operation S2 which simultaneously cools the freezing compartment 1 and the refrigerating compartment 2 by driving the first compressor 11 and the second compressor 21 together and operating the first freezing cycle device C1 and the second freezing cycle device C2 together (S1) (S2).

The control module 4 drives each of the first fan 15, The second fan 25, and the third fan 35 during the high-temperature initial simultaneous operation (S2).

On the other hand, if the time for driving the first compressor 11 and the second compressor 21 together is maintained for a long period of time at the beginning of the operation of the refrigerator, the control module 4, particularly, the power device 42 may be excessively heated, and in this case, may cause abnormal operation.

The control module 4 may terminate the high-temperature initial simultaneous operation S2 to protect the power device 42. The control module 4 may terminate the high-temperature simultaneous operation S2 when the temperature of the freezing compartment 1 falls into the freezing compartment set temperature (for example, −13° C.) or less or the refrigerating compartment 2 falls into the refrigerating compartment set temperature (for example, 8° C.), during the high-temperature initial simultaneous operation S2.

One example in which the control module 4 terminates the high-temperature initial simultaneous operation S2 may be a case where, during the high-temperature initial simultaneous operation S2, the temperature of the freezing compartment 1 exceeds the freezing compartment set temperature (for example, −13° C.) and the temperature of the refrigerating compartment 2 is the refrigerating compartment set temperature (for example, 8° C.) or less. The control module 4 terminates the high-temperature initial simultaneous operation S2 and performs the high-temperature initial alternation operation S5 as will be described below.

Another example in which the control module 4 terminates the high-temperature initial simultaneous operation S2 may be a case where the temperature of the freezing compartment 1 is the freezing compartment set temperature (for example, −13° C.) or less during the high-temperature initial simultaneous operation S2, the freezing compartment temperature is the freezing compartment upper limit temperature, or the refrigerating compartment temperature is the refrigerating compartment upper limit temperature. In this case, the control module 4 may terminate the high-temperature initial simultaneous operation S2 and perform the high-temperature general simultaneous operation S8 or the high-temperature general alternation operation S9 as will be described below.

First, case where the high-temperature initial alternation operation S5 is performed after the high-temperature initial simultaneous operation S2 will be described.

The control module 4 alternately drives the first compressor 11 and the second compressor 21 during the high-temperature initial alternation operation S5 and when the first compressor 11 and the second compressor 21 are driven alternately without being driven together, the temperature of the power device 42 may be maintained within the safe range (S3) (S4) (S5).

In a case where the control module 4 alternately drives the first compressor 11 and the second compressor 21, the control module 4 drives the first fan 15 when the first compressor 11 is driven, drives the second fan 25 when the second compressor 21 is driven, and drives the third fan 35 during the high-temperature initial alternation operation S5.

In other words, the refrigerator performs the high-temperature initial simultaneous operation S2, which is performed when the operation begins by turning on the power when the outside air temperature is high. The high-temperature initial alternation operation S5 is performed when the temperature of the freezing compartment 1 exceeds the freezing compartment set temperature (for example, −13° C.) and the temperature of the refrigerating compartment 2 falls into the refrigerating compartment set temperature (for example, 8° C.) or less, during the high-temperature initial simultaneous operation S2. The high-temperature initial simultaneous operation S2 and the high-temperature initial alternation operation S5 may be performed sequentially.

The control module 4 performs a high-temperature initial simultaneous operation S2 when the outside air temperature is the outside air set temperature or more and performs high-temperature initial alternation operation S5 if the freezing compartment temperature exceeds the freezing compartment set temperature and the refrigerating compartment temperature is the refrigerating set temperature or less during the initial simultaneous operations S1 and S2.

The outside air set temperature may be a temperature which is set to be higher than a general outside air temperature such as a temperature which is set within a range of 37° C. to 40° C. and the control module 4 performs a high-temperature initial simultaneous operation S2 when in a situation that the outside air temperature is high.

The control module 4 drives the first compressor 11 and the second compressor 21 together and drives the first fan 15, the second fan 25, and the third fan 35 during the high-temperature initial simultaneous operation S2.

The refrigerant of the first freezing cycle device C1 circulates through the first compressor 11, the first condenser 12, the first expansion mechanism 13, and the first evaporator 14, and when the first fan 15 circulates cold air in the freezing compartment 1 to the first evaporator 14 and the freezing compartment 1, the freezing compartment 1 is cooled.

The refrigerant of the second freezing cycle device C2 circulates through the second compressor 21, the second condenser 22, the second expansion mechanism 23, and the second evaporator 24, and when the second fan 25 circulates cold air in the refrigerating compartment 2 to the second evaporator 24 and the refrigerating compartment 2, the refrigerating compartment 2 is cooled.

The refrigerator may quickly lower the freezing compartment temperature and the refrigerating compartment temperature, respectively, during high-temperature initial simultaneous operation S2.

The control module 4 controls either the first compressor or the second compressor 21 to the maximum freezing capacity TDC and controls the other one to the set freezing capacity which is lower than the maximum freezing capacity TDC.

In a case where both first compressor 11 and second compressor 21 are controlled to the maximum freezing capacity TDC, the control module 4 may overheat, and in a case where one of the first compressor 11 and the second compressor 21 is controlled to the set freezing capacity which is lower than the maximum freezing capacity TDC, it is possible to minimize the excessive temperature rise of the control module 4.

Since the time for lowering the freezing compartment temperature to the freezing compartment satisfaction temperature is generally longer than the time for lowering the refrigerating compartment temperature to the refrigerating compartment satisfaction temperature, the control module 4 controls the first compressor 11 to the maximum freezing capacity TDC and controls the second compressor 21 to the set freezing capacity which is lower than the maximum freezing capacity TDC.

Meanwhile, the control module 4 drives the first fan 15, the second fan 25, and the third fan 35 together at a high-temperature initial simultaneous operation S2 and be driven to a low first set operation rate, which is lower than the highest operation rate, respectively.

An example of the first set operation rate of each of the first fan 15, the second fan 25, and the third fan 35 may be 90% of the highest operating rate of each of the first fan 15, the second fan 25, and the third fan 35.

In this case, the control module 4 controls the first fan 15 to a first set operating rate (for example, 90%) which is lower than the highest operating rate (100%) of the first fan 15, and controls the second fan 25 to a first set operation rate (for example, 90%) which lower than the highest operation rate (100%) of the second fan 25 and controls the third fan 35 to a first set operation rate (for example, 90%) which is lower than the highest operating rate of the third fan 35.

Hereinafter, for the convenience of explanation, the first set operation rate is 90% of the highest operation rate, and the second set operation rate is of the highest operation rate, but the present invention is not limited to these numerical value as a matter of course.

During the high-temperature initial simultaneous operation S2, the freezing compartment temperature and the refrigerating compartment temperature may be quickly lowered, respectively, as illustrated in FIG. 8, and, at this time, the temperature of the power device 42 may increase as time elapses.

The refrigerator may be managed such that the temperature of the control module 4 does not excessively rise during the high-temperature initial alternation operation S5 performed after the high-temperature initial simultaneous operation s2.

The control module 4 performs alternately the freezing compartment single operation which operates the first compressor 11 for the first set time T1 and the refrigerating compartment single operation which operates the second compressor 21 for the second set time T2.

The high-temperature initial alternation operation S5 may be started from the refrigerating compartment single operation among the freezing compartment single operation and the refrigerating compartment single operation, and then the freezing compartment single operation and the refrigerating compartment single operation may be alternately performed.

The refrigerator cools the refrigerating compartment 2 during the second set time T2 and cools the freezing compartment 1 during the first set time T1 after the second set time T2 when the high-temperature initial alternation operation S5 starts and the refrigerating compartment 2 and the freezing compartment 1 may be alternately cooled as time elapses.

The first set time T1 may be set to be longer than the second set time T2. For example, if the first set time T1 is set to 20 minutes, then the second set time T2 may be set to 10 minutes. In this case, the refrigerator first cools the refrigerating compartment 2 for 10 minutes, then the freezing compartment 1 is cooled for 20 minutes, and thereafter the refrigerating compartment cooling operation and the freezing compartment cooling operation may be alternately performed.

The control module 4 controls the first compressor 11 to the maximum freezing capacity TDC during the high-temperature initial alternation operation S5. The control module 4 controls the second compressor 21 to the maximum freezing capacity TDC during the high-temperature initial alternation operation.

During the high-temperature initial alternation operation S5, the refrigerating compartment 2 and the freezing compartment 1 may be alternately cooled and the average temperature of the power device 42 during the high-temperature initial alternation operation S5 may be lower than the temperature of the power device 42 immediately before the end of the high-temperature initial simultaneous operation S2. The control module 4 controls the second compressor 21 which is driven with the set freezing capacity during the high-temperature initial simultaneous operation S2 to the maximum freezing capacity TDC when the high-temperature initial alternation operation S5 is started.

When the second compressor 21 is driven with the maximum freezing capacity TDC during the high-temperature initial alternation operation S5, the refrigerating compartment 2 may be quickly cooled while the second compressor 21 is driven.

In other words, during the high-temperature initial alternation operation S5, the second compressor 21 is driven with the maximum freezing capacity TDC and is stopped during the second set time T2, and the first compressor 11 is driven with the maximum freezing capacity TDC and is stopped during the first set time T1, and the maximum freezing capacity driving of the second compressor 21 and the maximum freezing capacity driving of the first compressor 11 may be alternately performed.

On the other hand, the control module 4 drives the first fan 15 at the first set operation rate (90%) when the first compressor 11 is driven during the high-temperature initial alternation operation S5, drives the second fan 25 at a first set operating rate (90%) when driving the second compressor 21, and drives the third fan 35 at a first set operating rate (90%) during the high-temperature initial alternation operation S5.

During the high-temperature initial alternation operation S5 as described above, the cold air in the refrigerating compartment 2 circulates through the refrigerating compartment evaporator 24 and the refrigerating compartment 2 to cool the refrigerating compartment 2 and the cold air in the freezing compartment 1 circulates through the freezing compartment evaporator 14 and the freezing compartment 1 to cool the freezing compartment 1.

During the high-temperature initial alternation operation S5 as described above, the freezing compartment temperature increases or decreases in a temperature range of the room temperature while repeating the increase and the decrease in temperature as illustrated in FIG. 8, and the freezing compartment temperature may lowered continuously as illustrated in FIG. 8.

On the other hand, during the high-temperature initial alternation operation S5, the temperature of the power device repeatedly decreases and increases as the refrigerating compartment single operation and the freezing compartment single operation are alternately repeated, and an average temperature of the power device 42 may be lower than before the start the high-temperature initial alternation operation S5, and damage due to overheating of the power device 42 may be minimized.

In other words, the refrigerator may be managed so that the temperature of the control module 4 does not excessively increase during the high-temperature initial alternation operation S5 performed after the high-temperature initial simultaneous operation S2.

The freezing compartment temperature may fall into the freezing compartment set temperature or less during the initial high-temperature initial operation (high-temperature initial simultaneous operation and high-temperature initial alternation operation) as described above, and when the freezing compartment temperature falls into the freezing compartment set temperature or less, thereafter, the refrigerator performs the high-temperature general alternation operation S8 or the high-temperature general simultaneous operation S9 depending on whether or not the freezing compartment temperature is the freezing compartment upper limit temperature or whether or not the refrigerating compartment temperature is the refrigerating compartment upper limit temperature.

Hereinafter, the high-temperature general simultaneous operation S8 and the high-temperature general alternation operation S9 will be described.

The freezing compartment temperature may fall into the freezing compartment set temperature or less during the high-temperature initial simultaneous operation S2, and in this case, depending on whether or not the freezing compartment temperature is at the freezing compartment upper limit temperature and whether or not the refrigerating compartment temperature is at the refrigerating compartment upper limit temperature, the refrigerator performs the high-temperature general simultaneous operation S8 or high-temperature general alternation operation S9 (S2) (S3) (S7) (S8) (S9).

The freezing compartment temperature may fall into the freezing compartment set temperature or less during the high-temperature initial alternation operation S5 and in this case, depending on whether or not the freezing compartment temperature is the freezing compartment upper limit temperature and whether or not the refrigerating compartment temperature is the refrigerating compartment upper limit temperature, the refrigerator performs the high-temperature general simultaneous operation S8 or high-temperature generation alternation operation S9 (S5) (S6) (S7) (S8) (S9).

In other words, when the freezing compartment temperature falls into the freezing compartment set temperature or less, the control module 4 terminates the high-temperature initial operation (high-temperature initial simultaneous operation and high-temperature initial alternation operation), and converts into the high-temperature general operation (the high-temperature general simultaneous operation and the high-temperature general alternation operation).

Hereinafter, the high-temperature general simultaneous operation S8 will be described in detail.

If the freezing compartment temperature is at the freezing compartment set temperature or less during the high-temperature initial simultaneous operation S2 or the high-temperature initial alternation operation S5 and the freezing compartment temperature is at the freezing compartment upper limit temperature or the refrigerating compartment temperature is at the refrigerating compartment upper limit temperature, the control module 4 performs the high-temperature general simultaneous operation (S7) (S8).

The control module 4 terminates the operation (high-temperature initial simultaneous operation S2 or high-temperature initial alternation operation S5), which was previously performed, and starts the high-temperature general simultaneous operation S8.

The control module 4 drives the first compressor 11 and the second compressor 21 together, and the first fan 15, the second fan 25, the third fans 35 may be driven during the high-temperature general simultaneous operation S8.

The control module 4 controls the first compressor 11 to the maximum freezing capacity TDC and controls the second compressor 21 in the maximum freezing capacity TDC during the high-temperature general simultaneous operation S8.

The high-temperature general simultaneous operation S8 may be an operation for lowering the freezing compartment temperature to the freezing compartment upper limit temperature or less and may be an operation which is performed at a condition that the outside air temperature is high.

The control module 4 controls the first compressor 11 and the second compressor 21 to the maximum freezing capacity TDC during the high-temperature general simultaneous operation S8 and desirably continues to lower the temperatures of both freezing compartment 1 and refrigerating compartment 2.

The control module 4 drives each of the first fan 15, the second fan 25, and the third fan 35 at the second set operation rate (75%) during the high-temperature general simultaneous operation S8. Here, the second set operation rate (75%) may be an operation rate which is lower than the highest operation rate (100%) or the first set operation rate (90%).

During the high-temperature general simultaneous operation S8, the control module 4 controls the first fan 15 to a second set operating rate (75%) which is lower than the first set operating rate (90%) of the first fan 15 and controls the second fan 25 to a second set operation rate (75%) which is lower than the first set operation rate (90%) of the second fan 25, and controls the third fan 35 to a second set operation rate (75%) which is lower than the first set operation rate (90%) of the third fan 35.

During the high-temperature general simultaneous operation S8 of the refrigerator, when the cold air in the freezing compartment 1 cools the freezing compartment 1, the cold air cools the refrigerating compartment 2 while circulating through the freezing compartment evaporator 14 and the freezing compartment 1.

During the high-temperature general simultaneous operation S8, the first fan 15 is driven at the second set operation rate (75%) so that the power consumption of the first fan 15 may be minimized while the temperature of the freezing compartment is gradually decreased without being changed abruptly. The second fan 25 is driven at a second set operating rate (75%) during the high-temperature general simultaneous operation S8 so that the power consumption of the second fan 25 may be minimized while the temperature of the refrigerating compartment gradually falls without being changed abruptly.

The high-temperature general simultaneous operation S8 may be performed when the temperature of the freezing compartment exceeds the freezing compartment upper limit temperature and the refrigerating compartment temperature is at the refrigerating compartment upper limit temperature, and the refrigerating compartment temperature preferably gradually decreases the freezing compartment temperature while the second fan 25 is driven with the second set operation rate (75%) which is lower than the highest operation rate (100%) and the first set operation rate (90%).

On the other hand, in the refrigerator, during the high-temperature initial simultaneous operation S2 or during the high-temperature initial alternation operation S5, the freezing compartment temperature is at the set temperature or less, the freezing compartment temperature may lower than the freezing compartment upper limit temperature, and the refrigerating compartment temperature may be lower than the refrigerating compartment upper limit temperature.

If the freezing compartment temperature is at the freezing compartment set temperature or less, thereafter, the freezing compartment temperature may be lower than the freezing compartment upper limit temperature, and the refrigerating compartment temperature may be lower than the refrigerating compartment upper limit temperature during the high-temperature initial simultaneous operation S2 or during the high-temperature initial alternation operation S5, and the control module 4 performs the high-temperature general alternation operation S9.

The control module 4 switches the operation of the refrigerator from high-temperature initial simultaneous operation S2 or high-temperature initial alternation operation S5 to high-temperature general alternation operation S9.

In addition, the refrigerator may have the freezing compartment temperature which is lower than the freezing compartment upper limit temperature and the refrigerating compartment temperature which is lower than the refrigerating compartment upper limit temperature during the high-temperature general simultaneous operation S8.

If the freezing compartment temperature is lower than the freezing compartment upper limit temperature and the refrigerating compartment temperature is lower than the refrigerating compartment upper limit temperature during the high-temperature general simultaneous operation S8, the control module 4 switches from the high-temperature general simultaneous operation S8 to the high-temperature general alternation operation S9.

Hereinafter, the high-temperature general alternation operation S9 will be described.

During the high-temperature general alternation operation S9, the control module 4 alternately drives the first compressor 11 and the second compressor 21, drives the first fan 15 when the first compressor 11 is driven, drives the second fan 25 when the second compressor 21 is driven, and drives the third fan 35.

The control module 4 controls the first compressor 11 to the maximum freezing capacity TDC and controls the second compressor 21 to the maximum freezing capacity TDC during the high-temperature general alternation operation S9.

Since the high-temperature general alternation operation S9 is an operation which is performed under the condition that the outside air temperature is at the outside air set temperature or more, the first compressor 11 and the second compressor 21 may be controlled to the maximum freezing capacity TDC, respectively. During the high-temperature general alternation operation S9, the temperature of the freezing compartment 1 decreases and increases in the freezing compartment dissatisfaction range B and the freezing compartment satisfaction range C, and the temperature of the refrigerating compartment 2 decreases and increases in the refrigerating compartment dissatisfaction range E and the refrigerating compartment satisfaction range F.

The control module 4 drives each of the first fan 15, the second fan 25, and the third fan 35 at a second set operation rate (75%) which is lower than the first set operation rate (90%) as in the high-temperature general simultaneous operation S8 during the high-temperature general alternation operation S9.

The high-temperature general alternation operation S9 may continue until the freezing compartment temperature falls into the freezing compartment satisfaction range C and the refrigerating compartment temperature falls into the refrigerating compartment satisfaction range F.

The control module 4 continues the high-temperature general alternation operation S9 until a condition that the freezing compartment temperature is in the freezing compartment satisfaction range C and a condition that the refrigerating compartment temperature is in the refrigerating compartment satisfaction range F are all satisfied.

During the high-temperature general alternation operation S9, the control module 4 turns on the first compressor 11 and the first fan 15 to cool the freezing compartment if the freezing compartment temperature is in the freezing compartment dissatisfaction range B and the refrigerating compartment temperature is in the refrigerating compartment satisfaction range F.

During the high-temperature general alternation operation S9, the control module 4 turns on the second compressor 21 and the second fan 25 so as to cool the refrigerating compartment if the freezing compartment temperature is in the freezing compartment satisfaction range C and the refrigerating compartment temperature is in the refrigerating compartment dissatisfaction range E.

During the high-temperature general alternation operation S9, the control module 4 turns off the first compressor 11, the second compressor 21, the first fan 15, the second fan 25, and the third fan 35 if the freezing compartment temperature is in the freezing compartment satisfaction range C and the refrigerating compartment temperature is in the refrigerating compartment satisfaction range F.

The control module 4 may substantially perform the high-temperature initial operations (high-temperature initial simultaneous operation S2 and high-temperature initial alternation operation S5) and the high-temperature general operations (high-temperature general simultaneous operation S8 and high-temperature general alternation operation S9), and then control the first freezing cycle device C1 while comparing the freezing compartment temperature with the freezing compartment upper limit temperature, the freezing compartment dissatisfaction range and the freezing compartment satisfaction range and control the second freezing cycle device C2 while comparing the refrigerating compartment temperature with the refrigerating compartment upper limit temperature, the refrigerating compartment dissatisfaction range, and the refrigerating compartment satisfaction range.

Meanwhile, the refrigerator of the present embodiment may further include the low-temperature initial simultaneous operation S11, the low-temperature general operations (low-temperature general simultaneous operation S13 and low-temperature general alternation operation S14) performed when the outside air temperature is lower than the outside air set temperature.

Hereinafter, the low-temperature initial simultaneous operation S11 will be described first.

The control module 4 performs the low-temperature initial simultaneous operation S11 when the outside air temperature is lower than the outside air set temperature (S1) (S11).

The control module 4 drives the first compressor 11 and the second compressor 21 and drives each of the first fan 15, the second fan 25, and the third fan 35 during the low-temperature initial simultaneous operation S11.

Although the temperature of the outside air is low-temperature which is lower than the outside air set temperature, in a case where the operation is started by applying power, the freezing compartment and the refrigerating compartment is high-temperature which is close to the outside air temperature, and the control module 4 drives each of the first compressor 11, the second compressor 21, the first fan 15, the second fan 25, and the third fan 35 so that each of the freezing compartment 1 and the refrigerating compartment 2 is quickly cooled.

The control module 4 controls the first compressor 11 to the maximum freezing capacity TDC and the second compressor 21 to the maximum freezing capacity TDC during the low-temperature initial simultaneous operation S11. During the low-temperature initial simultaneous operation S11, the freezing compartment evaporator 14 and the refrigerating compartment evaporator 24 may be cooled quickly.

During the low-temperature initial simultaneous operation S11, the control module 4 drives each of the first fan 15, the second fan 25, and the third fan 35 with the second set operation rate (75%) which is lower than the highest operation rate (100%). The low-temperature initial simultaneous operation S11 is an operation which is performed when the outside air temperature is lower than the outside air set temperature, and during the low-temperature initial simultaneous operation S11, the control module 4 drives each of the first fan 15, the second fan 25, and the third fan 35 with a second set operating rate (75%) which is lower than the highest operating rate (100%) so that the power consumption may be reduced while gradually decreasing the freezing compartment temperature and the refrigerating compartment temperature.

The control module 4 performs low-temperature general simultaneous operation S13 when the freezing compartment temperature is at the freezing compartment upper limit temperature or the refrigerating compartment temperature is at the refrigerating compartment upper limit temperature during the low-temperature initial simultaneous operation S11 (S12) (S13).

The control module 4 performs the low-temperature general alternation operation S14 when the freezing compartment temperature is lower than the freezing compartment upper limit temperature and the refrigerating compartment temperature is lower than the refrigerating compartment upper limit temperature during the low-temperature initial simultaneous operation S11 (S12) (S14).

The control module 4 performs low-temperature general alternation operation S14 when the freezing compartment temperature is lower than the freezing compartment upper limit temperature and the refrigerating compartment temperature is lower than the refrigerating compartment upper limit temperature during the low-temperature general simultaneous operation S13 (S13) (S12) (S14).

Hereinafter, low-temperature general simultaneous operation S13 will be described.

During the low-temperature general simultaneous operation S13, the control module 4 drives the first compressor 11 and the second compressor 21 together and drives each of the first fan 15, the second fan 25, and the third fan 35.

The control module 4 controls the first compressor 11 and the second compressor 21 in a variable cooling capacity during the low-temperature general simultaneous operation S13.

The low-temperature general simultaneous operation S13 is an operation which is performed at a condition that the outside air temperature is lower than the outside air set temperature and the control module 4 controls each of the first compressor 11 and the second compressor 21 in a various cooling capacity in accordance with the outside air temperature.

The control module 4 controls the first compressor 11 and the second compressor 21 with a high freezing capacity corresponding to high outside air temperature when the outside air temperature is high during the low-temperature general simultaneous operation S13.

On the contrary, the control module 4 controls the first compressor 11 and the second compressor 21 with a low freezing capacity corresponding to low outside air temperature when the outside air temperature is low during the low-temperature general simultaneous operation S13.

During the low-temperature general simultaneous operation S13 as described above, the refrigerator may lower the freezing compartment temperature and the refrigerating compartment temperature while minimizing power consumption.

The control module 4 drives the first fan 15, the second fan 25, and the third fan 35 at the second set operation rate (75%) which is lower than the highest operation rate (100%) and the first set operating rate (90%) during the low-temperature general simultaneous operation S13.

The low-temperature general simultaneous operation S13 may be an operation which is performed when the outside air temperature is lower than the outside air set temperature and during the low-temperature general simultaneous operation S13, the control module 4 preferably drives each of the first fan 15, the second fan 25, and the third fan 35 with the second set operating rate (75%) which is lower than the highest operating rate (100%) so that the power consumption may be reduced while gradually decreasing the freezing compartment temperature and the refrigerating compartment temperature.

Hereinafter, the low-temperature general alternation operation S14 will be described.

The control module performs low-temperature general alternation operation S14 when the freezing compartment temperature is lower than the freezing compartment upper limit temperature and the refrigerating compartment temperature is lower than the refrigerating compartment upper temperature during the low-temperature initial simultaneous operation S11.

During the low-temperature general alternation operation S14, the control module alternately drives the first compressor 11 and the second compressor 21, drives the first fan 15 when the first compressor 11 is driven, drives the second fan 25 when the second compressor 21 is driven and drives the third fan 35.

During the low-temperature general alternation operation S14, the control module 4 controls the first compressor 11 and the second compressor 21, respectively, in a variable freezing capacity as in the low-temperature general simultaneous operation S13 and the detailed description thereof is omitted since the detail thereof is the same or similar as the low-temperature general simultaneous operation S13.

During the low-temperature general alternation operation S14, as in the low-temperature general simultaneous operation S13, the control module 4 drives each of the first fan 15, the second fan 25, and the third fan 35 with the second set operation rate (75%) which is lower than the highest operation rate (100%) and the first set operation rate (90%), and detailed description thereof is omitted since the detail thereof the same or similar as the low-temperature general simultaneous operation S13.

The low-temperature alternation operation S14 may continue until the freezing compartment temperature falls into the freezing compartment satisfaction range C and the refrigerating compartment temperature falls into the refrigerating compartment satisfaction range F.

The control module 4 continues the low-temperature general alternation operation S14 until a condition that the freezing compartment temperature is at the freezing compartment satisfaction range C and a condition that the refrigerating compartment temperature is at the refrigerating compartment satisfaction range (F) are all satisfied.

In the low-temperature general alternation operation S14, the first compressor 11 and the first fan 15 are turned on to cool the freezing compartment when the freezing compartment temperature is in the freezing compartment dissatisfaction range B and the refrigerating compartment temperature is in the refrigerating compartment satisfaction range F.

In the low-temperature general alternation operation S14, the second compressor 21 and the second fan 25 are turned on to cool the refrigerating compartment when the freezing compartment temperature is in the freezing compartment satisfaction range and the refrigerating compartment temperature is in the refrigerating dissatisfaction range E.

In the low-temperature general alternation operation S14, the control module 4 turns off the first compressor 11, the second compressor 21, the first fan 15, the second fan 25, and the third fan 35 when the freezing compartment temperature is in the freezing compartment satisfaction range C and the refrigerating compartment temperature is in the refrigerating compartment satisfaction range F.

The control module 4 sequentially performs the low-temperature initial simultaneous operation S11 and the low-temperature general operations (low-temperature general simultaneous operation S13 and/or low-temperature general alternation operation S14), and then controls the first freezing cycle device C1 while comparing the freezing compartment temperature with the freezing compartment upper limit temperature, the freezing compartment dissatisfaction range and the freezing compartment satisfaction range and controls the second freezing cycle device C2 while comparing the refrigerating compartment temperature with the refrigerating compartment upper limit temperature, the refrigerating compartment dissatisfaction range, and the refrigerating compartment satisfaction range.

The above description merely illustrative of the technical idea of the present invention, and various modifications and changes may be made by those skilled in the art without departing from the essential characteristics of the present invention.

Therefore, the embodiments disclosed in the present invention are not intended to limit the scope of the present invention.

The protection scope of the present invention should be construed according to the following claims, and all technical ideas within the scope of equivalents thereof should be construed as being included in the scope of the present invention.

What is claimed is:

1. A refrigerator comprising:
   a first freezing cycle device which includes a first compressor, a first condenser, a first expansion mechanism, and a first evaporator, through which a first refrigerant circulates;
   a first fan which circulates cool air in a freezing compartment to the first evaporator and the freezing compartment;
   a second freezing cycle device which includes a second compressor, a second condenser, a second expansion mechanism, and a second evaporator, through which a second refrigerant circulates;
   a second fan which circulates cold air in a refrigerating compartment to the second evaporator and the refrigerating compartment;
   a third fan which blows outside air to the first condenser and the second condenser; and
   a control module which controls the first compressor, the second compressor, the first fan, the second fan, and the third fan,
   wherein the control module
      performs a high-temperature initial simultaneous operation when an outside air temperature is at an outside air set temperature or more, and
      finishes the high-temperature initial simultaneous operation and performs a high-temperature initial alternation operation when a freezing compartment temperature is not at a freezing compartment set temperature or less, and a refrigerating compartment temperature is at a refrigerating compartment set temperature or less during the high-temperature initial simultaneous operation, and
   wherein the control module
      drives the first compressor and the second compressor together and drives each of the first fan, the second fan, and the third fan during the high-temperature initial simultaneous operation, and
      alternately drives the first compressor and the second compressor during the high-temperature initial alternation operation,
   wherein the outside air set temperature is higher than the freezing compartment set temperature and the refrigerating compartment set temperature,
   wherein the control module
      alternately performs a freezing compartment single operation in which the first compressor is driven for a first set time and a refrigerating compartment single operation in which the second compressor is driven for a second set time during the high-temperature initial alternation operation, and
   wherein the first set time is longer than the second set time.

2. The refrigerator according to claim 1,
   wherein the control module
      controls the first compressor to a maximum freezing capacity and controls the second compressor to a set freezing capacity which is lower than the maximum freezing capacity, during the high-temperature initial simultaneous operation, and
      controls the first compressor to the maximum freezing capacity and controls the second compressor to the maximum freezing capacity, during the high-temperature initial alternation operation.

3. The refrigerator according to claim 1,
   wherein the control module
      drives each of the first fan, the second fan, and the third fan at a first set operation rate which is lower than a highest operation rate, during the high-temperature initial simultaneous operation, and
      drives the first fan at the first set operation rate when the first compressor is driven, drives the second fan at the first set operation rate when the second compressor is driven, and drives the third fan at the first set operation rate, during the high-temperature initial alternation operation.

4. The refrigerator according to claim 1,
   wherein the control module
      performs a high-temperature general simultaneous operation when the freezing compartment temperature falls into the freezing compartment set temperature or less and the freezing compartment temperature is at a freezing compartment upper limit temperature or the refrigerating compartment temperature is at a refrigerating compartment upper limit temperature during the high-temperature initial simultaneous operation or during the high-temperature initial alternation operation, and
   wherein the control module drives the first compressor and the second compressor together and drives each of the first fan, the second fan, and the third fan, during a high-temperature general simultaneous operation,
   wherein the freezing compartment upper limit temperature and the refrigerating compartment upper limit temperature are set to be lower than the freezing compartment set temperature.

5. The refrigerator according to claim 4,
   wherein the control module
      controls the first compressor to a maximum freezing capacity and controls the second compressor to a set freezing capacity which is lower than the maximum freezing capacity, during the high-temperature initial simultaneous operation, and
      controls the first compressor to the maximum freezing capacity and controls the second compressor to the maximum freezing capacity, during the high-temperature general simultaneous operation.

6. The refrigerator according to claim 4,
   wherein the control module
      drives each of the first fan, the second fan, and the third fan at a first set operation rate which is lower than a highest operation rate during the high-temperature initial simultaneous operation, and
      drives each of the first fan, the second fan, and the third fan at a second set operation rate which is lower than the first set operation rate, during the high-temperature general simultaneous operation.

7. The refrigerator according to claim 1,
wherein the control module performs a high-temperature general alternation operation when the freezing compartment temperature is at the freezing compartment set temperature or less, the freezing compartment temperature is lower than a freezing compartment upper limit temperature and the refrigerating compartment is lower than a refrigerating compartment upper limit temperature, during the high-temperature initial simultaneous operation or during high-temperature initial alternation operation,
wherein the control module, during the high-temperature general alternation operation,
alternately drives the first compressor and the second compressor,
drives the first fan when the first compressor is driven,
drives the second fan when the second compressor is driven, and
drives the third fan.

8. The refrigerator according to claim 7,
wherein the control module
controls the first compressor to a maximum freezing capacity and controls the second compressor to a set freezing capacity which is lower than the maximum freezing capacity, during the high-temperature initial simultaneous operation, and
controls the first compressor to the maximum freezing capacity and controls the second compressor to the maximum freezing capacity, during the high-temperature general alternation operation.

9. The refrigerator according to claim 7,
wherein the control module
drives each of the first fan, the second fan, and the third fan at a first set operation rate which is lower than a highest operation rate during the high-temperature initial simultaneous operation, and
drives each of the first fan, the second fan, and the third fan at a second set operation rate which is lower than the first set operation rate, during the high-temperature general alternation operation.

10. The refrigerator according to claim 7,
wherein the high-temperature general alternation operation continues until the freezing compartment temperature falls into a freezing compartment satisfaction range and the refrigerating compartment temperature falls into a refrigerating compartment satisfaction range.

11. The refrigerator according to claim 10,
wherein the control module turns on the first compressor and the first fan to cool the freezing compartment if the refrigerating compartment temperature is in the refrigerating compartment satisfaction range and the freezing compartment is in a freezing compartment dissatisfaction range.

12. The refrigerator according to claim 10,
wherein the control module turns on the second compressor and the second fan to cool the refrigerating compartment if the freezing compartment temperature is in the freezing compartment satisfaction range and the refrigerating compartment is in a refrigerating compartment dissatisfaction range.

13. The refrigerator according to claim 1,
wherein the control module
performs a low-temperature initial simultaneous operation when the outside air temperature is lower than the outside air set temperature, and
the control module, during the low-temperature initial simultaneous operation,
drives the first compressor and the second compressor together, and
drives each of the first fan, the second fan, and the third fan.

14. The refrigerator according to claim 13,
wherein the control module, during the low-temperature initial simultaneous operation,
controls the first compressor to a first maximum freezing capacity,
controls the second compressor to a second maximum freezing capacity, and
drives each of the first fan, the second fan, and the third fan to a set operation rate which is lower than a highest operation rate.

15. The refrigerator according to claim 13,
wherein the control module
performs a low-temperature general simultaneous operation when the freezing compartment temperature is at a freezing compartment upper limit temperature or the refrigerating compartment temperature is at a refrigerating compartment upper limit temperature, during low-temperature initial simultaneous operation, and
the control module, during the low-temperature general simultaneous operation,
drives the first compressor and the second compressor together, drives each of the first fan, the second fan, and the third fan, and controls each of the first compressor and the second compressor in variable freezing capacity in accordance with the outside air temperature.

16. The refrigerator according to claim 15,
wherein the control module drives each of the first fan, the second fan, and the third fan with a set operating rate which is lower than a highest operating rate.

17. The refrigerator according to claim 13,
wherein the control module
performs the low-temperature general alternation operation, when the freezing compartment temperature is lower than a freezing compartment upper limit temperature and the refrigerating compartment temperature is lower than a refrigerating compartment upper limit temperature,
wherein the control module, during the low-temperature general alternation operation,
alternately drives the first compressor and the second compressor,
drives the first fan when the first compressor is driven,
drives the second fan when the second compressor is driven,
drives the third fan, and
controls each of the first compressor and the second compressor in variable freezing capacity in accordance with the outside air temperature.

18. The refrigerator according to claim 17,
wherein the control module turns on the first compressor and the first fan to cool the freezing compartment if the refrigerating compartment temperature is in a refrigerating compartment satisfaction range and the freezing compartment is in a freezing compartment dissatisfaction range.

19. The refrigerator according to claim 17,
wherein the control module turns on the second compressor and the second fan to cool the refrigerating compartment if the freezing compartment temperature is in a freezing compartment satisfaction range and the refrigerating compartment is in a refrigerating compartment dissatisfaction range.

* * * * *